United States Patent [19]

Inoue

[11] Patent Number: 4,952,786
[45] Date of Patent: Aug. 28, 1990

[54] INFORMATION RECORDING AND REPRODUCING APPARATUS HAVING SWITCHING MEANS FOR DISABLING CONTROL OF MEDIUM DRIVE BY A PHASE LOCKED LOOP IN A PLAYBACK MODE

[75] Inventor: Hiroshi Inoue, Tokyo, Japan

[73] Assignee: Canon Kabushiki Kaisha, Tokyo, Japan

[21] Appl. No.: 221,678

[22] Filed: Jul. 20, 1988

[30] Foreign Application Priority Data

Jul. 31, 1987 [JP] Japan ............................. 62-190447

[51] Int. Cl.$^5$ ..................... G06K 13/04; G06K 13/08
[52] U.S. Cl. ................................. 235/480; 235/476; 235/454
[58] Field of Search ............... 235/436, 449, 454, 475, 235/476, 477, 479, 480; 369/53, 54, 48; 360/2, 70, 73.5, 73.6

[56] References Cited

U.S. PATENT DOCUMENTS

| | | | |
|---|---|---|---|
| 4,167,023 | 9/1979 | Bessette et al. | 360/70 |
| 4,330,196 | 5/1982 | Yamaguchi | 355/8 |
| 4,390,905 | 6/1983 | Tokitsu | 235/436 |
| 4,639,649 | 1/1987 | Seto | 318/314 |
| 4,698,703 | 10/1987 | Nishimura et al. | 360/73.06 |
| 4,815,062 | 3/1989 | Suzuki | 369/48 |
| 4,831,243 | 5/1989 | Enari et al. | 235/436 |

Primary Examiner—Steven L. Stephan
Assistant Examiner—Robert A. Weinhardt
Attorney, Agent, or Firm—Fitzpatrick, Cella, Harper & Scinto

[57] ABSTRACT

An information recording and reproducing device includes a head for recording and reproducing information on and from a recording medium, a drive for reciprocally driving the recording medium relative to the recording and reproducing head at a faster speed in a reproducing mode than in a recording mode, a frequency signal producer for producing a frequency signal representing a drive speed of the recording medium, a first control for comparing an output signal of the frequency signal producer with a reference clock signal and feeding a phase error therebetween back to the drive, a second control for detecting the drive speed of the recording medium and feeding a signal representing an error between the detected drive speed and a target speed back to the drive and a switching device for activating at least the first control in the recording mode and deactivating the first control and activating the second control in the reproducing mode.

8 Claims, 3 Drawing Sheets

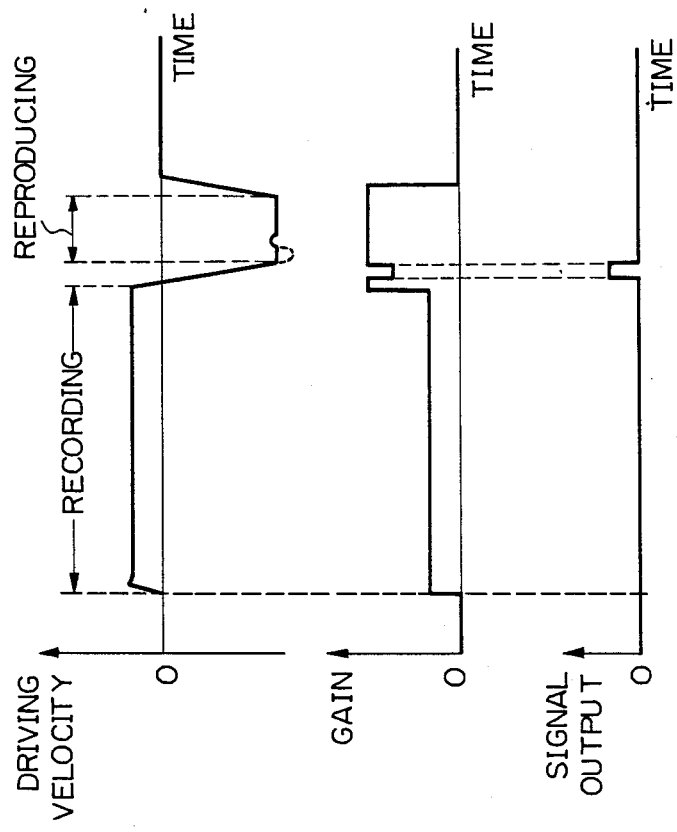

INFORMATION RECORDING AND REPRODUCING APPARATUS HAVING SWITCHING MEANS FOR DISABLING CONTROL OF MEDIUM DRIVE BY A PHASE LOCKED LOOP IN A PLAYBACK MODE

BACKGROUND OF THE INVENTION

1. Field of the Invention

The present invention relates to an apparatus for recording and reproducing information by reciprocally driving a record medium relative to a head, and more particularly, to an information recording and reproducing apparatus having means for controlling a drive speed of a medium.

2. Related Background Art

Magnetic and optical apparatus have been known as information recording and reproducing apparatus which records and reproduces information by reciprocally driving an information recording medium relative to a head. In addition, the optical apparatus has been recently particularly noticed.

The recording medium of the optical information recording and reproducing apparatus which records and reproduces information by using a light beam includes the disk-shaped optical disk, card-shaped optical card and optical tape. These have respective features and are selectively used depending on the object and application. Among others, the optical card has a wide application because of its ease of manufacture, portability and accessability.

Various means for scanning the optical card by a light beam are known. A method of reciprocally and linearly moving the record medium relative to the light beam and relatively moving the beam irradiation position orthogonally to the direction of the reciprocal movement is simple in construction and assures a high precision.

FIG. 1 shows a schematic construction to illustrate control of the reciprocal movement of the optical card in the prior art optical information recording and reproducing apparatus.

In FIG. 1, a card C is reciprocally driven in a direction of extension of an information track T by a belt 2 and pinch rollers 3 and 33 as a motor 1 rotates. The right edge and left edge of the driven card C are detected by edge detectors 4 and 5, respectively. The motor 1 is provided with an encoder 6 for detecting speed, and an output thereof is applied to a frequency-voltage converter (FVC) 7 which converts a pulse signal representing a rotation speed of the motor 1 to a voltage signal. An error signal between the detected speed and a target speed is produced, amplified by an amplifier (AMP) 8 and then supplied to a loop filter 9, an output of which is supplied to a motor driver 11 through polarity inverter 10. The motor driver 11 supplies a drive current to the motor 1 to control the rotation speed of the motor 1. The inverter 10 switches a polarity of the voltage in accordance with the drive direction of the motor 1 in response to a command from a main control circuit 13 sent through an interface 12. In this manner, a drive servo is constructed.

When the detector 4 or 5 detects the right or left edge of the card C, information is sent to the main control circuit 13 through the interface 12. The main control circuit 13 decodes the information and commands the drive direction of the motor 1 to the inverter 10 through the interface 12, commands switching of the gain of the amplifier 8 to a gain switching circuit 14, and command switching of a time constant of the FVC 7 to a time constant switching circuit 15. The drive control of the optical card is disclosed in copending U.S. Pat. Application Ser. No. 07/213,515 filed on June 28, 1988.

Data is recorded on the card C by modulating a laser diode in an optical head 16 in accordance with data sent from a record data source (not shown) to the optical head 16, and scanning a medium surface of the card C by a laser beam emitted from the laser diode. The data is reproduced by scanning the card C by a non-modulated laser beam and detecting reflected light by a photo-detector in the optical head 16. The optical head 16 is moved transversely to a track T by a stepping motor (not shown) to record and reproduce information on and from different tracks. The drive speed of the medium in a playback mode is usually faster than that in a record mode, as disclosed in U.S. Pat. Application Ser. No. 936,599 filed on Dec. 1, 1986, now U.S. Pat. No. 4,831,243.

One of the disadvantageous features of the apparatus is a fluctuation of the movement speed which causes nonuniform bit interval of the recorded data and reduces reliability in recording and reproducing information on and from the card. As a result, a high precision speed control is required by a card feed control system. However, in the prior art apparatus, it is difficult to control the speed with high precision in the record mode when the medium is driven at a relatively low speed.

As another speed control method, a phase locked loop (PLL) method in which an output from an encoder is phase-compared with a reference clock and a phase error is fed back to a motor, has been known. This method is disclosed in detail in U.S. Pat. No. 4,330,196 (May 18, 1982) and U.S. Pat. No. 4,639,649 (Jan. 27, 1987).

An advantage of the PLL system is a very high precision speed characteristic for a small mechanical load variation. On the other hand, it has a disadvantage that the distance and time required for phase lock and stabilization since the start of movement are long. Thus, the problem is minor when the motor is continuously rotated in one direction, but when the card is reciprocally moved at a high speed in the information recording and reproducing apparatus, astable speed areas occur at the opposite ends of the card, that is, the start-up area and braking area are long and an effective data record area is narrowed.

SUMMARY OF THE INVENTION

It is an object of the present invention to provide an information recording and reproducing apparatus which allows high precision speed control of a record medium while assuring a data record area of sufficient length.

The above object of the present invention is achieved by an information recording and reproducing apparatus comprising means for recording and reproducing information on and from a recording medium; means for reciprocally driving the recording medium relative to said recording and reproducing means at a faster speed in a playback mode than that in a recording mode; means for producing a frequency signal representing a drive speed of the recording medium;

first control means for comparing an output signal of said producing means with a reference clock signal and feeding a phase error therebetween back to said drive means; second control means for detecting the drive speed of the recording medium and feeding a signal representing an error between the detected drive speed and a target speed back to said drive means; and switching means for activating at least said first control means in the recording mode and deactivating said first control means and activating said second control means in the playback mode.

BRIEF DESCRIPTION OF THE DRAWINGS

FIGS. 3A to 3C show waveforms for explaining the operation of the apparatus of FIG. 2.

DETAILED DESCRIPTION OF THE PREFERRED EMBODIMENTS

Figure 1:
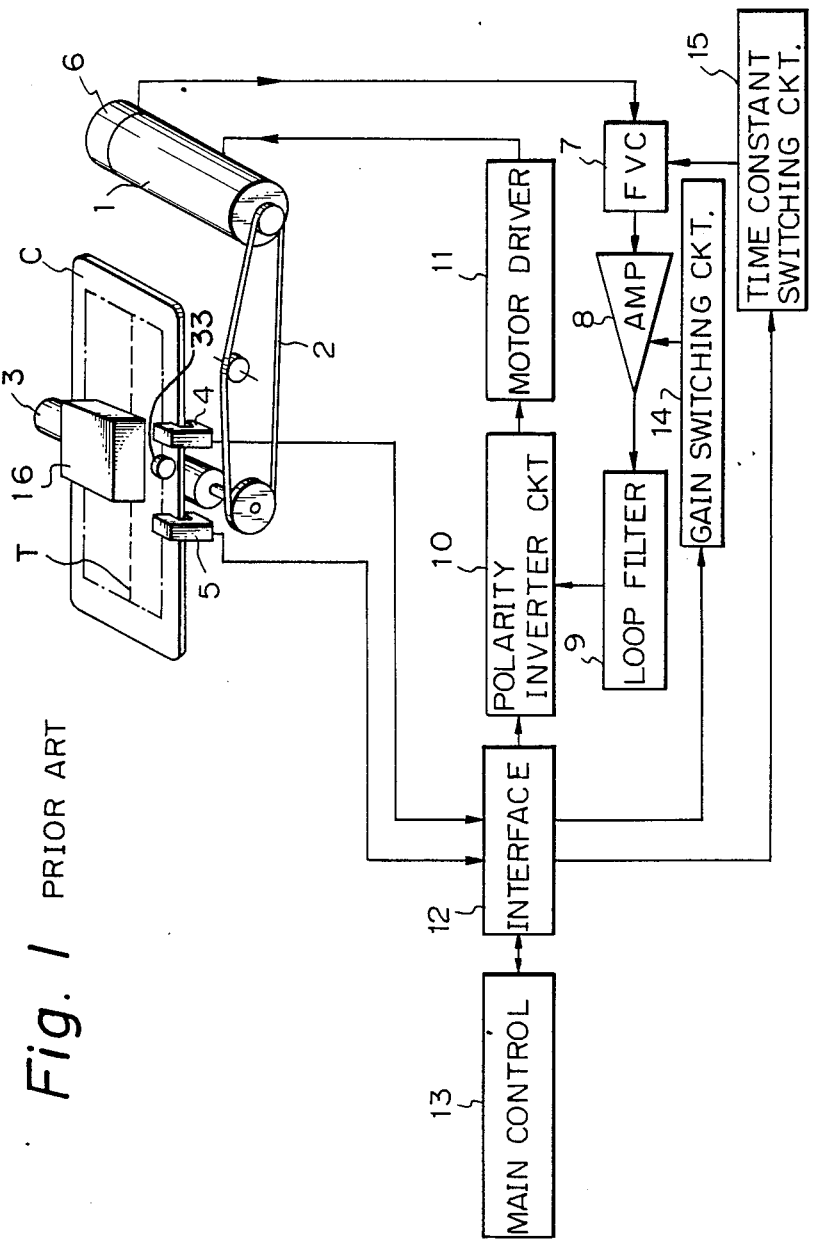
FIG. 1 shows a configuration of a prior art information recording and reproducing apparatus.
Figure 2:
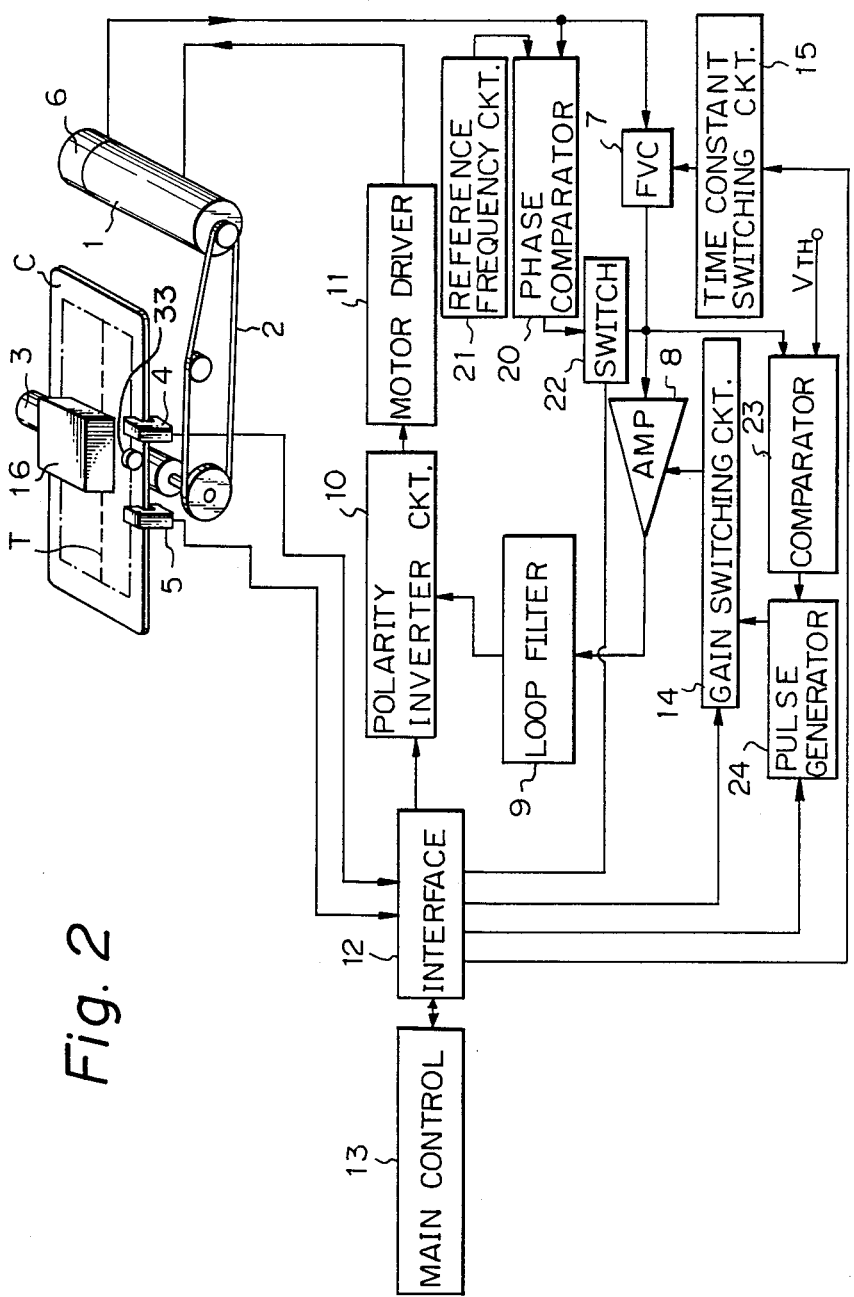
FIG. 2 shows one embodiment of an information recording and reproducing apparatus of the present invention.

FIG. 2 shows a configuration of one embodiment of an optical information recording and reproducing apparatus of the present invention, and FIGS. 3A to 3C show waveforms for explaining the operation thereof. In FIG. 2, like elements to those shown in FIG. 1 are designated by like numerals and detailed explanation thereof is omitted.

In the present embodiment, an output of the encoder 6 is supplied to the FVC 7 as well as to a phase comparator 20 to which a reference frequency signal is supplied from a reference frequency circuit 21. The output of the encoder 6 is phase compared with the reference frequency signal, and a comparison output is supplied to the amplifier 8 through a switch 22. The output of the FVC 7 is supplied to a comparator 23 where it is compared with a constant voltage $V_{TH}$. A pulse generator 24 is controlled by a comparison result so that a gain of a speed control loop is switched by the gain control circuit 14. The other portions are constructed in the same manner as that shown in FIG. 1.

FIG. 3A shows a drive speed of the card C, FIG. 3B shows a gain of the amplifier 8 and FIG. 3C shows a waveform of a signal supplied from the pulse generator 24 to the gain switching circuit 14.

The operation of the apparatus shown in FIG. 2 is now explained. When the edge detector 4 detects the right edge of the card C, the main control circuit 13 rotates the motor 1 clockwise through the interface 12 and the inverter 10. The card C is driven rightward at a predetermined record speed as shown in FIG. 3A and information is recorded on the track T by the optical head 16 The main control circuit 13 issues a command of time constant corresponding to the record speed of the time constant switching circuit 15, and sets the gain of the amplifier 8 to a level which permits stable control of the record speed, as shown in FIG. 3B, through the gain switching circuit 14. The switch 22 is turned on.

The pulse signal generated by the encoder 6 as the motor 1 is rotated is sent to the phase comparator 20 and the FVC 7. The phase comparator 20 phase-compares the pulse signal with the record reference frequency (clock) signal supplied from the reference frequency circuit 21 to produce a phase error signal, which is added to the speed error produced by the FVC 7 through the switch 22 and the combined error signal is supplied to the amplifier 8.

In the record mode, the phase comparator 20 and the FVC cooperate to control the speed. This permits fast rise of the speed control system to the constant speed and shortens the time and distance required to reach the constant speed. As described above, the speed in the record mode is lower than the speed in the reproducing mode, because of restriction by the optical sensitivity of the record medium and the laser beam output. Accordingly, even if the time required to reach the constant speed is a little bit long using the PLL system, the astable speed scan area on the card is not so long and a sufficient data record area is assured. Since PLL control is used the high precision speed control is attained, and data is recorded at an exact bit interval.

When one track of data has been recorded and the card C is moved rightward, the edge detector 5 detects the left edge of the card C and informs the main control circuit 13, which carries out a playback control operation (verification) to reproduce the recorded data for check.

In the verification, the main control circuit 13 commands the inverter 10 to rotate the motor 1 counterclockwise at a high speed. As a result, the card C is driven in the opposite direction to that in the record mode at a higher speed than that in the record mode, as shown in FIG. 3A. The main control circuit also commands the time constant switching circuit 15 to switch the time constant to correspond to the playback speed, and the gain switching circuit 14 to switch the gain. Thus, in the playback mode, the gain of the amplifier 8 is higher than that in the record mode, as shown in FIG. 3B. The switch 22 is turned off by the command from the main control circuit 13.

In the playback mode, the drive to the card C is controlled only by the output of the FVC 7. Since the drive speed in the playback mode is faster than that in the record mode, as described above, the speed variation may be kept in a practically acceptable range, without the PLL control. Since the PLL is not used, the rise time to the constant speed is fast and the non-effective area on the card C is not increased.

As shown by a broken line in FIG. 3A, the rapid rise of the drive speed in the playback mode causes an overshoot. Such an overshoot impedes the constant speed drive of the card. In the present embodiment, in order to reduce the overshoot, the error output from the FVC 7 is compared with the constant voltage $V_{TH}$ which is close to the error voltage at the target speed, by the comparator 23. When the output of the FVC 7 is lower than the voltage $V_{TH}$, the pulse generator 24 supplies a pulse signal of a predetermined width to the gain switching circuit 14 as shown in FIG. 3C. So long as the pulse signal is supplied, the gain switching circuit 14 reduces the gain of the amplifier 8, as shown in FIG. 3B, to prevent the overshoot.

As described in detail hereinabove, the information recording and reproducing apparatus of the present invention, which uses a high density information medium requiring reciprocal scan, switches the control system for the feed servo system between the record mode and the playback mode. In the record mode, data is recorded with low speed control with the PLL control to reduce the speed variation and assure recorded data of high precision bit interval and attain recording with shorter astable speed area. In the playback mode, high speed reproduction with speed control is carried out. Thus, the information recording and reproducing apparatus having a medium drive control mechanism which is relatively simple in construction and excellent in practicability can be provided.

Various modifications of the embodiment described above may be made. For example, while both the FVC and the phase comparator are used in the record mode in the above embodiment, the FVC may be deactivated so that control is done only by the output of the phase comparator. Means other than the combination of the encoder and the FVC may be used to detect the drive speed of the medium. In the embodiment, data is recorded and reproduced in the forward movement and the reverse movement, respectively. Alternatively, the medium may be driven in the same direction in the record mode and the playback mode. The present invention involves all such modifications, without departing from the scope of claims.

I claim:

1. An information recording and reproducing apparatus comprising:

recording and reproducing means for recording and reproducing information on and from a recording medium;

driving means for reciprocally driving the recording medium relative to said recording and reproducing means at a faster speed in a reproducing mode than in a recording mode;

frequency signal producing means for producing a frequency signal representing a drive speed of the recording medium;

first control means comprising means for comparing an output signal of said frequency signal producing means with a reference clock signal for generating a phase error signal and means for feeding the phase error signal back to said driving means;

second control means comprising means for detecting the drive speed of the recording medium, means for comparing the detected drive speed and a target speed for generating a speed error signal and means for feeding the speed error signal back to said driving means; and switching means comprising means for activating at least said first control means in the recording mode and deactivating said first control means and activating said second control means in the reproducing mode.

2. An information recording and reproducing apparatus according to claim 1, wherein said switching means further comprises means for activating both said first control means and said second control means in the recording mode, means for combining the output signals of said first and second control means into a combines signal, and means for feeding the combined signal to said driving means.

3. An information recording and reproducing apparatus according to claim 1, wherein said second control means further comprises means for converting the frequency signal produced by said frequency signal producing means into a voltage signal representing a speed of the recording medium by a frequency-voltage converter, and means for feeding the voltage signal back to said driving means.

4. An information recording and reproducing apparatus according to claim 3, further comprising means for switching a time constant of said frequency-voltage converter between the recording mode and the reproducing mode.

5. An information recording and reproducing apparatus according to claim 1, further comprising means for switching gains of said first and second control means such that the gains are higher in the reproducing mode than in the recording mode.

6. An information recording and reproducing apparatus according to claim 1, further comprising means for comparing the speed error signal produced by said second control means with a predetermined level in the reproducing mode to reduce the gain of said second control means for a predetermined period when the error signal is lower than the predetermined level.

7. An information recording and reproducing apparatus according to claim 1, wherein said recording medium comprises a card-shaped optical information recording medium and said recording and reproducing means comprises an optical head.

8. An information recording and reproducing apparatus according to claim 7, wherein said driving means comprises pinch rollers for pinching the recording medium and a motor for rotating said pinch rollers.

* * * * *

UNITED STATES PATENT AND TRADEMARK OFFICE
CERTIFICATE OF CORRECTION

PATENT NO. : 4,952,786

DATED : August 28, 1990

INVENTOR(S) : Hiroshi Inoue

It is certified that error appears in the above-identified patent and that said Letters Patent is hereby corrected as shown below:

COLUMN 2

Line 1, "command" should read --commands--.

COLUMN 3

Line 54, "head 16 The" should read --head 16. The--.

COLUMN 4

Line 13, "used the high" should read --used, high--.

COLUMN 6

Line 9, "bines signal," should read --bined signal,--.

Signed and Sealed this

Seventh Day of April, 1992

*Attest:*

HARRY F. MANBECK, JR.

*Attesting Officer*  *Commissioner of Patents and Trademarks*